US012743318B2

(12) United States Patent
Durazzo et al.

(10) Patent No.: US 12,743,318 B2
(45) Date of Patent: Sep. 22, 2026

(54) QUADRATIC UNCONSTRAINED BINARY OPTIMIZATION CUTTING

(71) Applicant: Dell Products L.P., Round Rock, TX (US)

(72) Inventors: Kenneth Durazzo, Morgan Hill, CA (US); Brendan Burns Healy, Haddonfield, NJ (US); Miguel Paredes Quiñones, Campinas (BR)

(73) Assignee: Dell Products L.P., Round Rock, TX (US)

( * ) Notice: Subject to any disclaimer, the term of this patent is extended or adjusted under 35 U.S.C. 154(b) by 447 days.

(21) Appl. No.: 18/321,474

(22) Filed: May 22, 2023

(65) Prior Publication Data

US 2024/0394335 A1 Nov. 28, 2024

(51) Int. Cl.
*G06F 9/50* (2006.01)
*G06F 17/16* (2006.01)

(52) U.S. Cl.
CPC ............ *G06F 9/5066* (2013.01); *G06F 17/16* (2013.01); *G06F 2209/5017* (2013.01)

(58) Field of Classification Search
None
See application file for complete search history.

(56) References Cited

U.S. PATENT DOCUMENTS 10,223,084 B1 3/2019 Dunn
10,817,337 B1 10/2020 Richardson et al.
11,280,826 B2 * 3/2022 He .................... G01R 31/2846
11,527,323 B2 12/2022 Michuda et al.
11,574,030 B1 2/2023 Harrigan et al.
11,907,092 B2 2/2024 Krneta et al.
12,447,617 B1 10/2025 Schuetz et al.
2011/0238378 A1 9/2011 Allen et al.
2014/0250288 A1 9/2014 Roy
2016/0057629 A1 * 2/2016 Dong .................... H04W 84/14 370/254
2018/0308000 A1 10/2018 Dukatz et al.
2019/0205790 A1 7/2019 Dukatz et al.
2020/0012948 A1 1/2020 Tian et al.
2020/0057957 A1 2/2020 Johnson et al.

(Continued)

FOREIGN PATENT DOCUMENTS

CA 2997970 A1 10/2018
WO 2023/018599 A1 2/2023

OTHER PUBLICATIONS

Denchev et al., What is the Computational Value of Finite-Range Tunneling?, Aug. 1, 2016, Physical Review X, 1-19, 6 / 031015.
Fixstars Amplify SDK; https://amplify.fixstars.com/en/sdk; accessed as early as May 2023.

(Continued)

*Primary Examiner* — Baboucarr Faal
(74) *Attorney, Agent, or Firm* — Workman Nydegger

(57) ABSTRACT

Cutting matrix configurations in order to execute complex quantum jobs is disclosed. A combinatorial optimization problem may be received and converted into a matrix configuration that can be executed by a quantum computing system. The matrix configuration is cut into k smaller matrix configurations that can be executed on different quantum computing systems or on the same quantum computing system. The smaller matrix configurations are executed and the solutions of the smaller matrix configurations are combined to generate a solution to the original matrix configuration.

20 Claims, 6 Drawing Sheets

(56) References Cited

U.S. PATENT DOCUMENTS

| | | | | |
|---|---|---|---|---|
| 2020/0118025 | A1 | 4/2020 | Romero et al. | |
| 2020/0272625 | A1 | 8/2020 | Brumby et al. | |
| 2020/0401565 | A1 | 12/2020 | Saillet et al. | |
| 2021/0097419 | A1 | 4/2021 | Limberg et al. | |
| 2021/0281592 | A1 | 9/2021 | Givental et al. | |
| 2021/0286328 | A1 | 9/2021 | Yoneoka | |
| 2021/0357797 | A1 | 11/2021 | Karalekas et al. | |
| 2022/0261688 | A1 | 8/2022 | Nimavat et al. | |
| 2022/0327479 | A1 | 10/2022 | Suguiura et al. | |
| 2023/0044102 | A1 | 2/2023 | Anderson et al. | |
| 2023/0047230 | A1 | 2/2023 | Roque et al. | |
| 2023/0047692 | A1 | 2/2023 | Roque et al. | |
| 2023/0048306 | A1 | 2/2023 | Roque et al. | |
| 2023/0069537 | A1* | 3/2023 | Allybokus | G06N 10/60 |
| 2023/0325461 | A1* | 10/2023 | Dudash | G06N 10/60 708/446 |
| 2023/0359922 | A1 | 11/2023 | Klimov | |
| 2024/0013048 | A1 | 1/2024 | Deshpande et al. | |
| 2024/0160687 | A1 | 5/2024 | Vollath et al. | |
| 2024/0330738 | A1 | 10/2024 | Shi et al. | |
| 2024/0354369 | A1 | 10/2024 | Bowles et al. | |

OTHER PUBLICATIONS

Gili Rosenberg, Mohammad Vazifeh, Brad Woods, Eldad Haber, Building an iterative heuristic solver for a quantum annealer, 2015, https://arxiv.org/abs/1507.07605.

Sheir Yarkoni et al, Quantum Annealing for Industry Applications, 2022 Reports on Progress in Physics 85 104001DOI 10.1088/1361-6633/ac8c54.

Olivier Goldschmidt et al, Polynomial Algorithm for the k-Cut Problem, 29th Annual Symposium on Foundations of Computer Science, Oct. 1988.

Hybrid Solvers—Ocean Documentation 8.1.0; https://docs.ocean.dwavesys.com/en/stable/overview/hybrid.html; accessed Jan. 9, 2025.

Uchehara, et al., Quantum Circuit Cutting https://pennylane.ai/qml/demos/tutorial_quantum_circuit_cutting; Sep. 1, 2022.

Abohashima et al., (Classification with Quantum Machine Learning: A Survey) Jun. 22, 2020 (Year: 2020).

Huang et al., "Benchmarking Quantum (-Inspired) Annealing Hardware on Practical Use Cases", Nov. 3, 2022, IEEE Transactions on Computers, vol. 72, No. 6, pp. 1692-1705. (Year: 2022).

Barbosa et al. "Using Machine Learning for Quantum Annealing Accuracy Prediction" (Year: 2021).

Gujarati et al. "Swayam: Distributed Autoscaling to Meet SLAs of Machine Learning Inference Services with Resource Efficiency" (Year: 2017).

* cited by examiner

Workflow 100
QUBO Configuration 102
$\underset{x}{\operatorname{argmin}}\, x^T Q x = \sum_{i,j=1}^{N} Q_{i,j} x_i x_j$
$for\ Q_{i,j} \in \mathbb{R}\ and\ x_i \in \{0,1\}$
Convert QUBO to Graph 104
x1
x2
x3
Q12
Q13
Q23
Hardware 106
Qubit
Coupler
Minor Graph Embedding 108
s1
s2
s3
s3
Program and Initialize 110
h1
h2
h3
h4
s1
s2
s3
s4
J12
J13
J24
J34
Annealing 112
A(t)
B(t)
t
Readout Solution 114

QUADRATIC UNCONSTRAINED BINARY OPTIMIZATION CUTTING

FIELD OF THE INVENTION

Embodiments of the present invention generally relate to quantum processing systems and quantum related operations. More particularly, at least some embodiments of the invention relate to systems, hardware, software, computer-readable media, and methods for separating quantum variables in quantum jobs and more specifically to cutting matrix configurations associated with combinatorial optimization problems into smaller matrix configurations for execution at quantum annealers.

BACKGROUND

Combinatorial optimization problems (COPs) are examples of computationally solvable problems. Combinatorial optimization problems can be formulated in diverse areas ranging from, by way of example, logistics and finance, to machine learning and manufacturing processes. However, there is no known algorithm for finding the best solution to a combinatorial optimization problem in a reasonable amount of time for many of these problems in classical systems. Much research has been devoted to finding classical heuristic techniques that seek good enough solutions to these problems.

A potential solution to this difficulty is to employ quantum annealing technologies to solve combinatorial optimization problems. While promising, quantum annealing technologies are often restricted. These restrictions manifest themselves in the number of available qubits, memory throughput, integer representation, and embedding technologies. Consequently, large industry scale problems are often too large for even the largest quantum annealing solutions.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
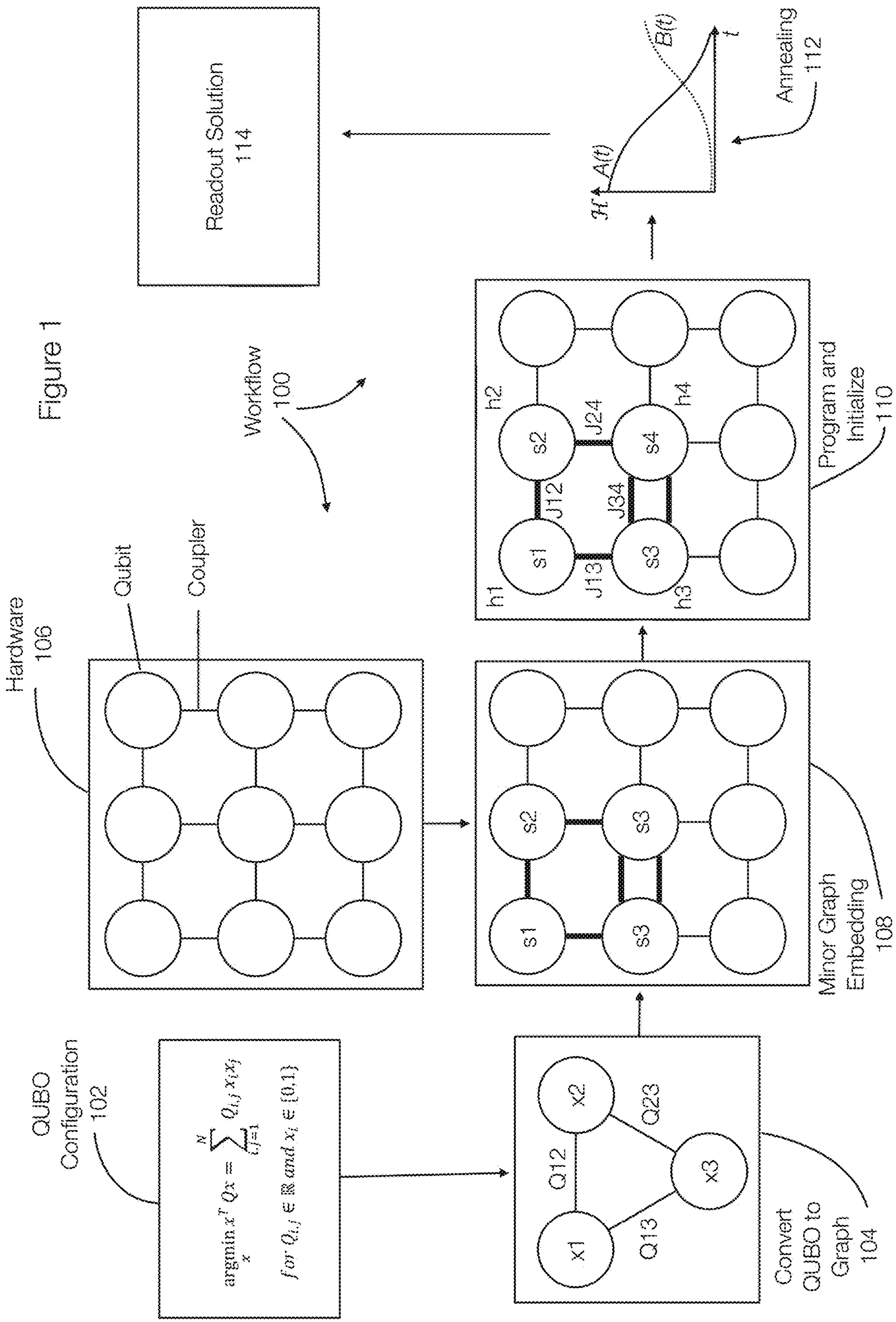
FIG. 1 discloses aspects of performing a quantum job.

Embodiments of the present invention generally relate to quantum computing systems and solving combinational optimization problems (COPs). More particularly, at least some embodiments of the invention relate to systems, hardware, software, computer-readable media, and methods for separating portions of the quantum job into smaller jobs and to executing aspects of a quantum job in parallel.

Quantum annealing systems or quantum annealers are examples of quantum computing systems that are configured to solve combinatorial optimization problems. Quantum annealing systems, which may be simulated or real, are typically constructed to solve combinatorial optimization problems more efficiently and robustly compared to classical computing systems.

However, quantum annealing systems cannot solve a combinatorial optimization problem directly. When a combinatorial optimization problem is presented, the combinatorial optimization problem must be converted to a Binary Quadratic Model (BQM). Examples of BQMs include Quadratic Unconstrained Binary Optimization (QUBO) and Ising models or configurations (also referred to as matrix configurations). Even if a combinatorial optimization problem can be converted to an appropriate matrix configuration, solving the BQM may not be feasible on a particular quantum annealing system for various reasons such as qubit connectivity, qubit availability, resource unavailability, or the like.

Embodiments of the invention are discussed in the context of QUBO configurations, but embodiments of the invention are not limited thereto and may be applied to BQM and other mathematical models or matrix configurations. The quadratic nature of a QUBO configuration indicates that some of the qubits, in the quantum annealing system, must be physically connected. For example, if a monomial term $a_{i,j}x_ix_j$ in a polynomial has $a_{i,j}\neq0$, then a physical connection is required between the qubits representing $x_i$ and $x_j$.

When a QUBO configuration is generated, embodiments of the invention relate to separating the variables into k groups. This may be performed, by way of example, using a polynomial algorithm for a k-cut problem. This is discussed in: Olivier Goldschmidt et al., "Polynomial Algorithm for the k-CUT Problem," 1988, in SFCS '88: Proceedings of the 29th Annual Symposium on Foundations of Computer Science, pp. 444-451, which is incorporated by reference in its entirety and is referenced herein as "Polynomial Algorithm".

Thus, embodiments of the invention relate to cutting a QUBO configuration into k smaller QUBO configurations. The QUBO configuration generally includes a list of variables along with a symmetric, square or upper-triangular matrix representing the respective coefficients. The matrix can be analyzed for information that conveys how strongly connected the problem being considered is. For example, a dense matrix suggests that the binaries or variables of the problem are very connected and that the QUBO configuration should run or be executed on a highly connected (or fully connected) quantum computing system.

However, a matrix that includes many zeros requires less interactions between qubits. As a result, it may be possible to separate the variables into two or more subsets where the number of nonzero coefficients between variables of different subsets is minimal. Thus, the polynomial time algorithm specified in Polynomial Algorithm can be used to separate the QUBO into multiple smaller QUBOS with subsets for variable lists and a matrix of coefficients that is obtained by truncating the original matrix of the QUBO configuration. Some of the connections or coefficients may, as a result, be discarded or neglected. Further, this results, in one embodiment, in a lossy transformation as coefficients connecting the subgroups may be ignored or discarded.

The smaller QUBO configurations may be executed on different quantum annealers. Thus, the overall or original QUBO configuration is effectively executed in parallel using multiple quantum annealers (or in sequence when using the same quantum annealer for all of the smaller QUBO configurations). This advantageously allows smaller and more affordable quantum computing systems to be used. Further, embodiments of the invention may allow problems that cannot be solved (e.g., too large for available quantum hardware) as a whole to be solved in pieces.

FIG. 1 generally illustrates an example of a quantum job workflow. The quantum job workflow 100 extends, by way of example, from receiving a combinatorial optimization problem to generating a solution at a quantum computing system.

When a combinatorial optimization problem is received, the combinatorial optimization problem is typically processed or encoded in order to generate a BQM configuration, such as described by a QUBO definition 102. In this example, multiple QUBO definitions or configurations may be present, each a smaller portion of a larger QUBO definition or configuration. Each of the QUBO definitions or configurations may be executed as illustrated in FIG. 1 as quantum jobs.

The QUBO configuration or definition 102 is converted into a graph 104. This may include mapping a matrix to a graph, for example. Next, a minor embedding operation 108 is performed to map the QUBO graph 104 to the hardware 106 of a quantum computing system, such as a quantum annealer. Mapping the graph to the hardware is an example of a minor embedding operation that may not be possible on a given quantum annealer.

Once the minor graph embedding 108 is completed on a selected quantum annealing system, the quantum annealing system may be programmed and initialized 110 and the quantum job is executed by performing an annealing process 112. The solution 114 may then be read out or determined when the annealing process 112 is completed. In some examples the solution may be resampled and the annealing process may be repeated.

Aspects of quantum annealing are disclosed in Quantum Annealing for Industry Applications: Introduction and Review, Sheir Yarkoni et al 2022 *Rep. Prog. Phys.* 85 104001, which is incorporated by reference in its entirety.

Figure 2:
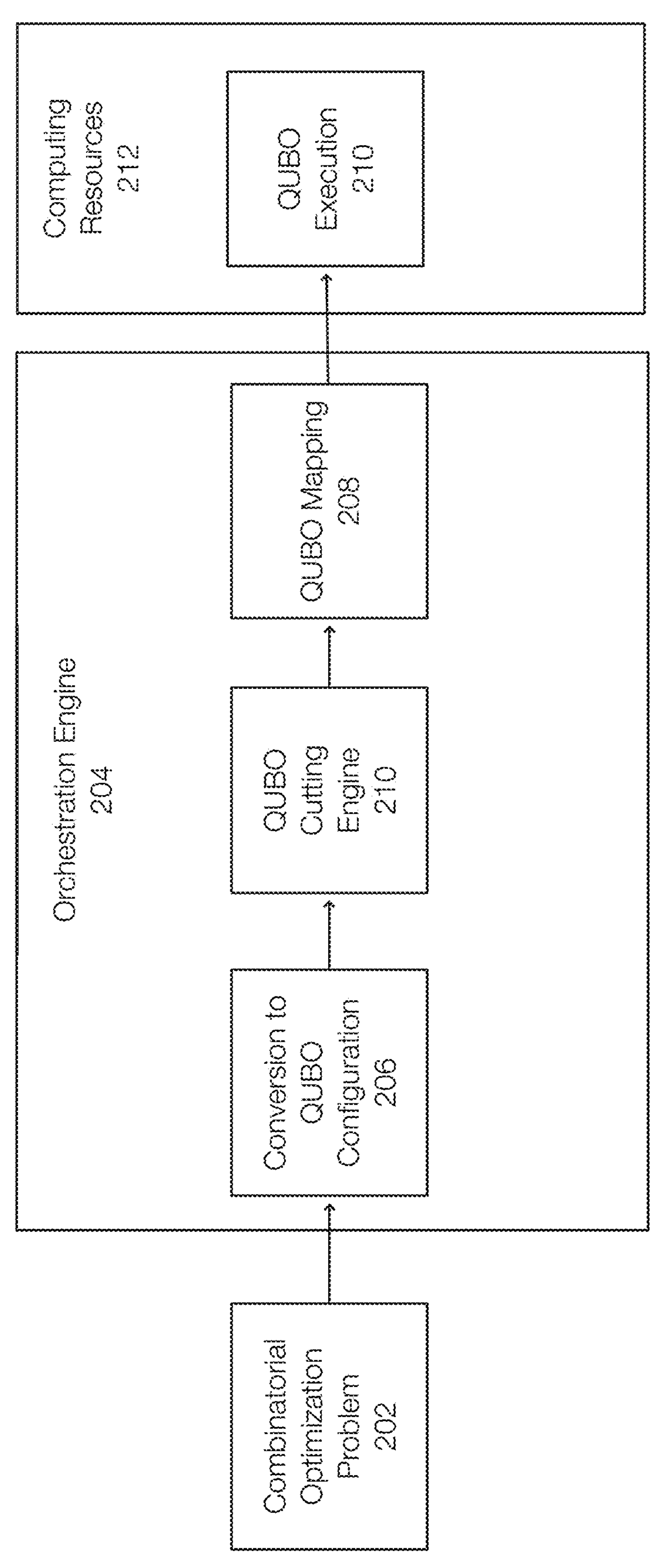
FIG. 2 discloses aspects of cutting quantum-related, such as matrix or QUBO, configurations or jobs into smaller quantum-related configurations.

FIG. 2 discloses aspects of a cutting operation performed in the context of a quantum job. More specifically, the cutting operation cuts a QUBO configuration into smaller QUBO configurations.

In the context of performing a cutting operation, FIG. 2 illustrates an orchestration engine 204 that is configured to orchestrate the execution of quantum jobs. When a task or operation of the quantum job is performed, the orchestration engine 204 may place the task or operation in the computing resources 212 (e.g., at a node or server). The computing resources 212 may include classical computing resources (CPU, GPU, processors, memory, etc.) and quantum computing resources (quantum annealers, QPU) or combinations thereof.

Many aspects of a quantum job are performed using classical computing systems. For example, generating a QUBO configuration, graphing the QUBO configuration, minor embedding the QUBO configuration, and the like are tasks or operations that may be placed, by the orchestration engine 204, in classical computing systems in the computing resources 212.

Before a combinatorial optimization problem is submitted to a quantum computing system, the orchestration engine 202 has the ability to process the incoming job in classical systems for various purposes. The orchestration engine 202 may have access to real-time information, including hardware specifications and availability of the computing resources 212, and is able to optimize the workflow accordingly. These factors, for example, may impact which tasks/operations are performed and/or a degree to which the tasks are performed. As discussed in more detail, for example, a cutting operation can be configured to trade accuracy for speed of execution.

In this example, a combinatorial optimization problem 202 (or other job type), which is an example of a quantum job, is received at the orchestration engine 204. The orchestration engine 204 then performs (or orchestrates) various tasks of a quantum job workflow. For example, the problem 202 is converted 206 to a QUBO configuration (or other format). As previously suggested, a QUBO configuration essentially includes a list of variables and a matrix representing the coefficients of the variables.

Once the QUBO configuration 206 is available, a QUBO cutting engine 210 is used to cut the QUBO configuration into k smaller QUBO configurations. The value of k may be set by a user, based on hardware specifications, hardware availability, based on a cutting threshold (speed/accuracy), or the like. The cutting operation may be placed in the computing resources 212 by the orchestration engine 204 or performed locally using resources of the orchestration engine 204.

Once the k smaller QUBO configurations are generated or obtained, each of the k QUBO configurations is graphed and mapped 208 (minor embedding operation) to a quantum annealer, which may be present in the computing resources 212. The k smaller QUBO configurations are deployed to the mapped quantum annealers and executed 210.

Figure 3:
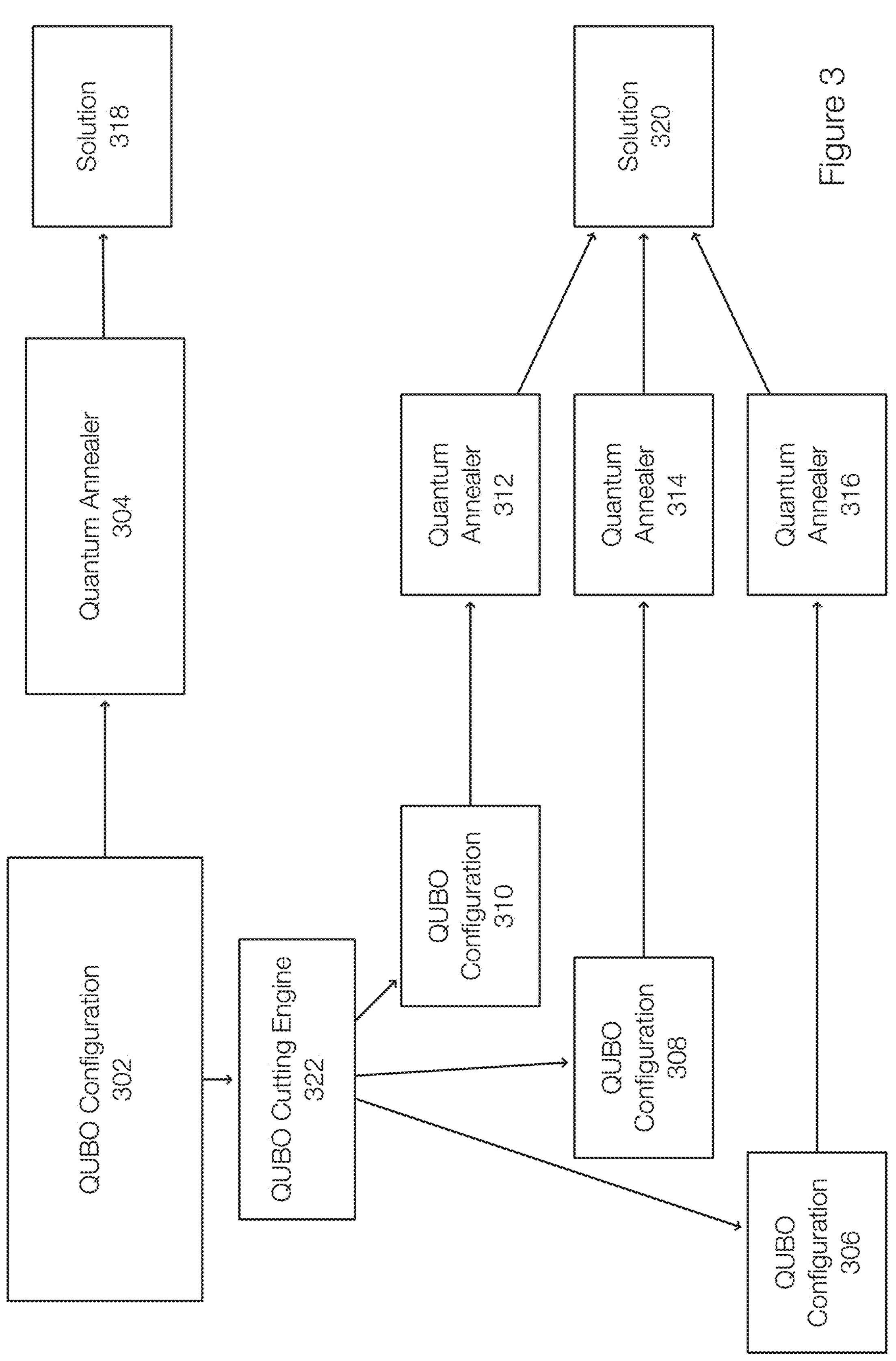
FIG. 3 discloses additional aspects of cutting a QUBO or other configuration into smaller QUBO or other configurations.

FIG. 3 discloses additional aspects of cutting a QUBO configuration. In FIG. 3, a problem has been converted or encoded as an original QUBO configuration 302. In this example, and by using by way of example only the algorithm disclosed in Polynomial Algorithm, k smaller QUBO configurations are generated by a QUBO cutting engine 322. Thus, the QUBO configuration 302 is analyzed and k (3 in this example) smaller QUBO configurations 306, 308, and 310 are generated by the cutting operation. The QUBO configurations 306, 308, and 310 are smaller in size than the QUBO configuration 302. This allows the QUBO configurations 306, 308, and 310 to be more easily graphed and more easily embedded to the quantum annealers 316, 314, and 3212. In addition, it may make it possible to execute the original QUBO configuration using the smaller QUBO configurations.

Once these additional operations are performed on the QUBO configurations 306, 308, and 310, the smaller QUBO configurations 306, 308, and 310 may be placed in, respectively, the quantum annealers 316, 314, and 312. The outputs of the quantum annealers 312, 314, and 316 can be aggregated or combined to form the solution 320.

If the QUBO configuration 302 is placed on a quantum annealer 304, assuming this to be possible, the quantum annealer 304 would generate a solution 318. However, the solution 320 may not be identical to the solution 318 at least because cutting the QUBO configuration 302 into smaller QUBO configurations is lossy as some coefficients and relationships may be ignored or discarded.

Figure 4:
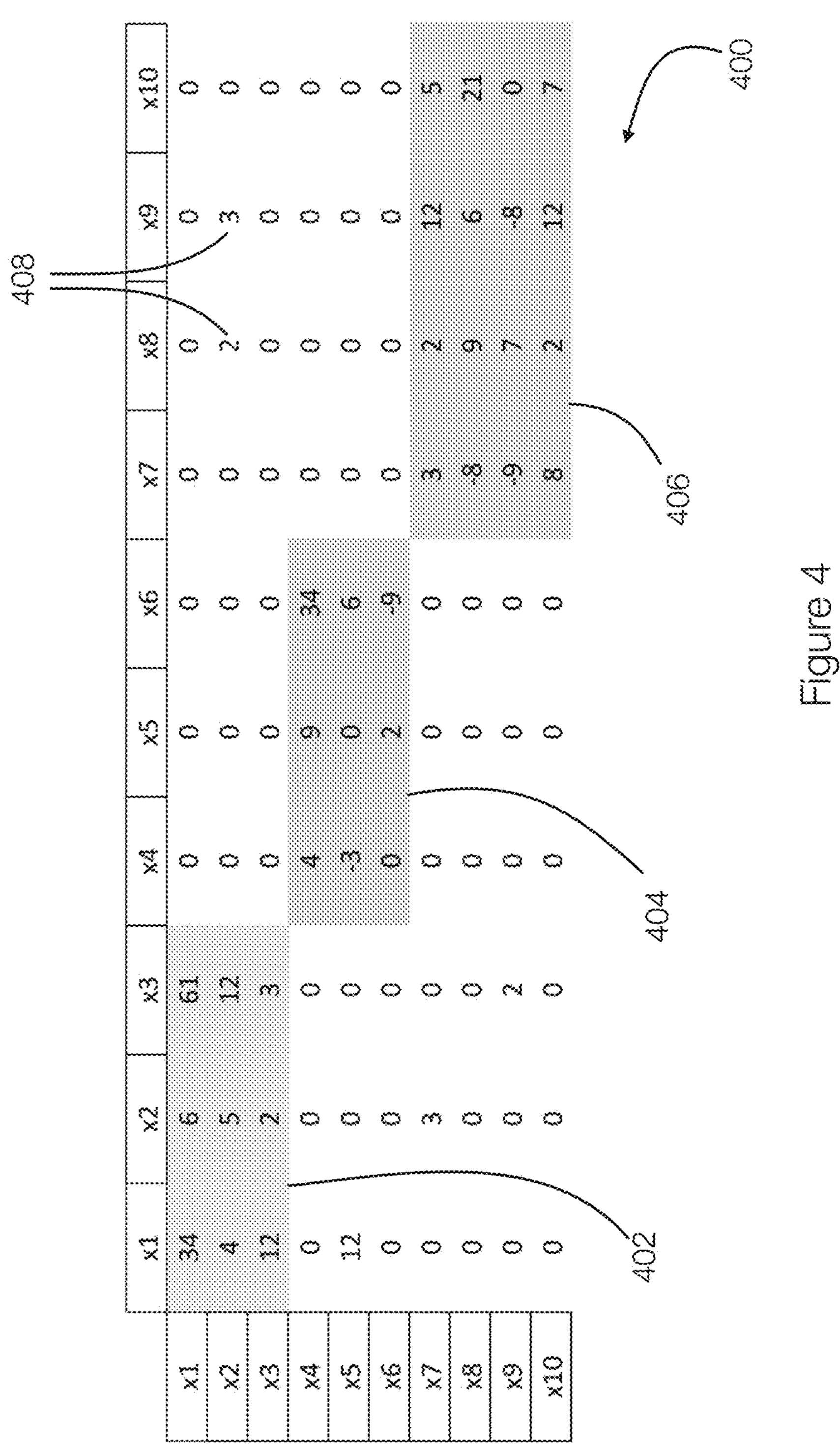
FIG. 4 discloses further aspects of cutting a QUBO configuration into smaller QUBO configurations.

FIG. 4 discloses aspects of cutting a QUBO configuration. FIG. 4 illustrates an arbitrary matrix 400 that is associated with variables $x_1 \ldots x_{10}$. The matrix illustrates coefficients of variables included in the QUBO configuration. The matrix 400 is small for illustration purposes as matrices of real combinatorial optimization problems may be very large and involve large numbers of variables.

Cutting a QUBO configuration may be combinatorial optimization problem in itself. However, the Polynomial Algorithm allows k groups to be identified more easily in polynomial time. As illustrated in FIG. 4, an instance of the k-cut algorithm generated three matrices 402, 404, and 406. These matrices are square matrices, but are not required to have the same dimensions. As illustrated in the matrix 402, none of the entries are 0 and the QUBO configuration of the matrix 402 is thus very dense. The matrices 404 and 406 are similarly dense.

However, the remaining entries of the matrix 400 are mostly zeros and are substantially less dense. Thus, even though the matrices 402, 404, and/or 406 may be related to each other via entries such as the coefficients or connections 408, these connections are discarded when truncating or cutting the matrix 400 to generate the smaller QUBO matrices 402, 404, and 406. In other words, the coefficients connecting the matrices 402, 404, and/or 406 and are not included in the k smaller QUBO matrixes and are discarded.

In one example, the cutting operation may resemble the following representation:

$$Q = \begin{pmatrix} Q_1 & \ldots & Q_{1,N} \\ \ldots & \ldots & \ldots \\ Q_{N,1} & \ldots & Q_N \end{pmatrix}.$$

However, the size of the cut or smaller matrices are not required to be the same size. Further, at least some of the entries in the original QUBO matrix may be discarded. The individual or smaller QUBO configurations can then be executed on separate quantum annealers such that execution of the smaller QUBO configurations is parallelized. Further, costs may be conserved as the smaller QUBO configurations may be executed on smaller and more affordable hardware.

Executing the matrix 402 in a quantum annealer may generate a solution for $x_1 \ldots x_3$, executing the matrix 404 in a quantum annealer may generate a solution for $x_4 \ldots x_6$, and executing the matrix 406 in a quantum annealer may generate a solution for $x_7 \ldots x_{10}$. These matrices 402, 404, and 406 may be executed in the same or different quantum annealers. These solutions may be aggregated or combined to generate the solution $x_1 \ldots x_{10}$ to the original QUBO configuration or matrix 400.

When performing a cutting operation to cut a QUBO configuration into smaller QUBO configurations, the process may be performed iteratively. In one example, every iteration may execute K number of QUBO problems. One set of $$x_k^l$$

at iteration l generates a solution $P_{k,l}$. As a result, every k QUBO problem $Q_k$ at iteration l is:

$$P_{k,l}\text{: } \min_{x_k} x_k^T Q_k x_k + \sum_{j \in \{1 \ldots K\} \setminus k} x_k^T \hat{Q}_{k,j} x_j^{l-1}.$$

In this example, $Q_k$ is the part of the QUBO matrix that only interacts with variables on subset k, and $Q_{k,j}$ is the part of the QUBO matrix with interacting variables of subset k and j.

This heuristic allows embodiments of the invention to save a current solution $x^l$ and iterations can be performed until a local minimum is achieved or when a number of L iterations are performed. The parallelization orchestration of updating solution $x^l$ is performed and can be achieved in multiple ways. For example, parts of $x^l$ coming from the solution of subproblem $P_{k,l}$ on one quantum annealer in parallel may be used to update the solution. In another example, embodiments of the invention may be optimized by reducing the coefficients on $Q_{k,j}$ and using a reduced version $Q_{k,j}$.

Figure 5:
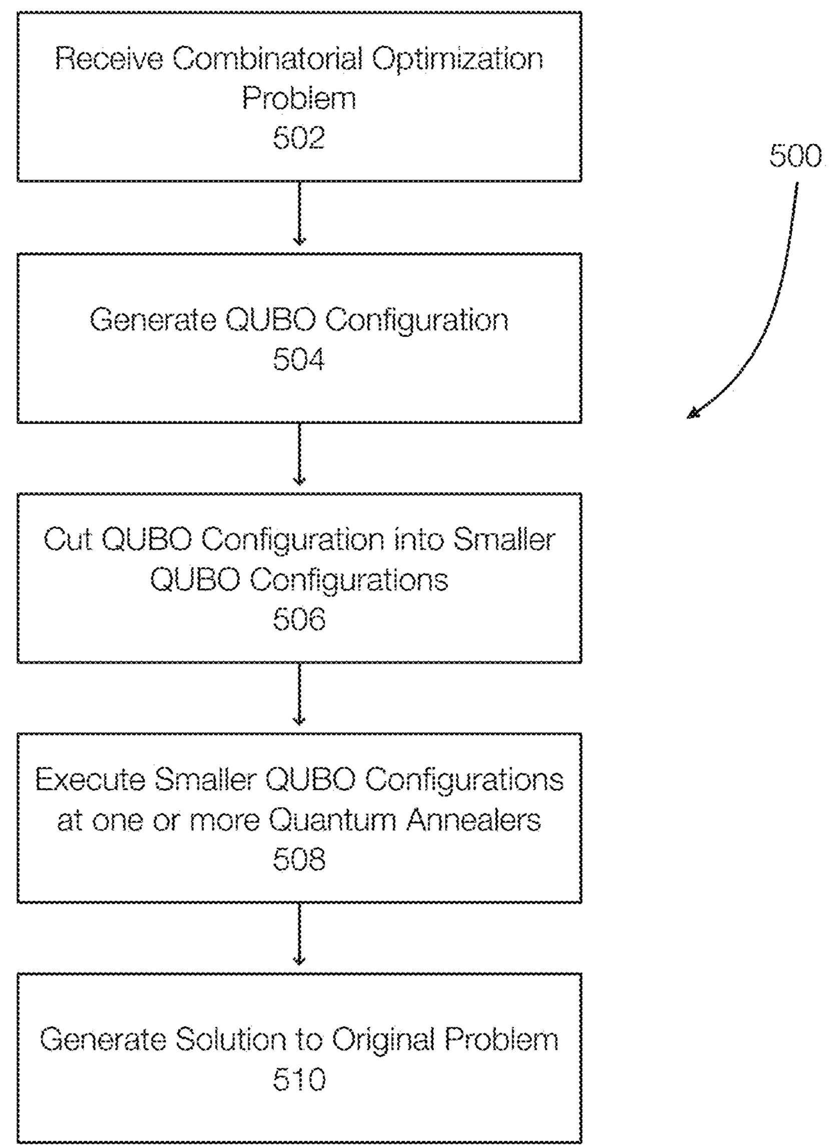
FIG. 5 discloses aspects of a method for cutting a QUBO configuration into k smaller QUBO configurations.

FIG. 5 discloses aspects of an example method for performing a quantum job, which includes performing a cutting operation. In the method 500, a combinatorial optimization problem (or other type of problem) is received by an orchestration engine as a quantum job. The orchestration engine is configured to orchestrate the execution of the quantum job. This includes determining or generating 504 a QUBO configuration corresponding to the received problem. In one example, the QUBO configuration may include a list of variables and a matrix containing coefficients associated with the list of variables.

Next, the QUBO configuration is cut into k smaller QUBO configurations. This may be achieved using a Polynomial Algorithm. Each of the smaller QUBO configurations is executed 508 at one or more quantum annealers. Thus, the orchestration engine can place each of the smaller QUBO configurations at a different quantum annealer, place the smaller QUBO configurations at the same quantum annealer, or combination thereof.

Once the smaller QUBO configurations have been executed and solutions have been achieved, the solutions can be combined to determine a solution 510 for the original uncut QUBO configuration. Because cutting 506 may discard some coefficients in the original matrix of the original QUBO configuration, the solution may differ from a solution to the original QUBO configuration. However, it is possible that the original QUBO configuration cannot be executed on any available quantum annealer.

Cutting 506 the original QUBO configuration may also be associated with a changeable cutting threshold. The cutting threshold determines a specificity for cutting. Setting the cutting threshold low, for example, may improve the speed of the cutting operation at the expense of accuracy. Setting the cutting threshold higher may improve the accuracy of the cutting operation at the expense of time or speed. The cutting threshold, for example, may be a target k value, an allowed execution time, a minimum size of the smaller QUBO configurations, or the like.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations which may include, but are not limited to, quantum job operations, quantum job orchestration operations, quantum annealing system selection operations, cutting operations, cutting threshold operations, feasibility operations (e.g., can a quantum annealer perform a quantum job), compilation operations, QUBO execution related operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data functionality. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients or nodes that are capable of collecting, modifying, and creating, data. As such, a particular client or node may employ, or otherwise be associated with, one or more instances of each of one or more applications that perform such operations with respect to data. Such clients or nodes may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment.

It is noted with respect to the disclosed methods, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: generating an original matrix configuration of a problem received at an orchestration engine, cutting the matrix configuration into smaller matrix configurations, executing each of the smaller matrix configurations on at least one quantum computing system, and combining solutions of the smaller matrix configurations executions at the at least one quantum computing system to generate a solution to the original matrix configuration and of the problem.

Embodiment 2. The method of embodiment 1, wherein the problem comprises a combinatorial optimization problem, the matrix configuration comprises a QUBO configuration, the smaller matrix configurations comprise smaller QUBO configurations, and the at least one quantum computing system comprises at least one quantum annealer.

Embodiment 3. The method of embodiment 1 and/or 2, further comprising cutting the QUBO configuration using a polynomial k-cut algorithm to generate k smaller QUBO configurations.

Embodiment 4. The method of embodiment 1, 2, and/or 3, further comprising orchestrating the cutting of the QUBO configuration in a classical computing system.

Embodiment 5. The method of embodiment 1, 2, 3, and/or 4, further comprising executing the smaller QUBO configurations in parallel at multiple quantum annealers.

Embodiment 6. The method of embodiment 1, 2, 3, 4, and/or 5, further comprising executing the smaller QUBO configurations sequentially at a particular quantum annealer.

Embodiment 7. The method of embodiment 1, 2, 3, 4, 5, and/or 6, wherein the smaller QUBO configurations include matrices that are more dense than portions of the original QUBO configuration that are discarded when generating the smaller QUBO configurations.

Embodiment 8. The method of embodiment 1, 2, 3, 4, 5, 6, and/or 7, further comprising setting a cutting threshold level that represents a tradeoff between speed and accuracy when performing the cutting operation.

Embodiment 9. The method of embodiment 1, 2, 3, 4, 5, 6, 7, and/or 8, further comprising performing the cutting in polynomial time.

Embodiment 10. The method of embodiment 1, 2, 3, 4, 5, 6, 7, 8, and/or 9, further comprising converting each of the smaller matrix configurations to a graph and performing a minor embedding operation for each of the graphs.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
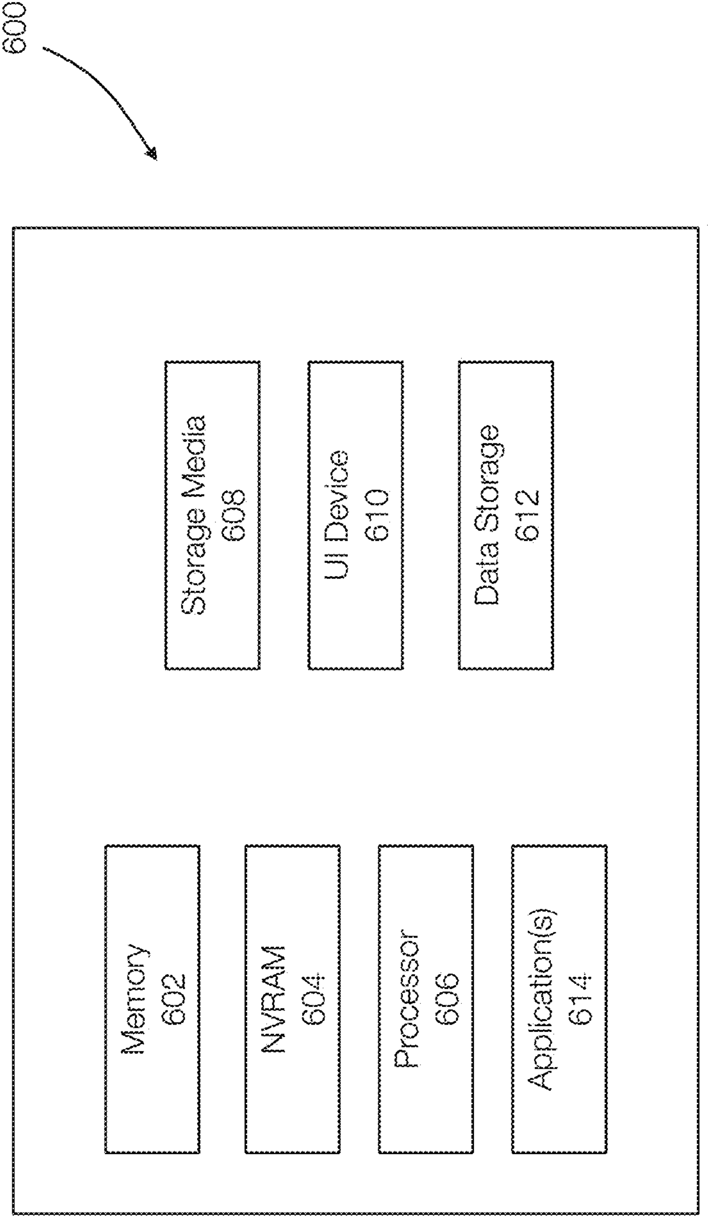
FIG. 6 discloses aspects of a computing device, system, or entity.

With reference briefly now to FIG. 6, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 600 is representative of classical computing systems, nodes, servers, clusters, virtual computers, or the like or combination thereof. The device 600 may also implement a virtual quantum system in a classical system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

generating an original Quadratic Unconstrained Binary Optimization (QUBO) matrix configuration of a problem received at an orchestration engine;

cutting the original QUBO matrix configuration into smaller matrix configurations by executing, at a QUBO cutting engine, a polynomial k-cut algorithm that partitions variables of the QUBO into k subsets based on coefficients of the QUBO matrix and discards coefficients connecting variables belonging to different subsets to generate k smaller QUBO configurations;

for each of the k smaller QUBO configurations, converting the smaller QUBO configuration to a graph and performing a minor embedding operation that maps the graph to qubit connectivity of a quantum annealer in accordance with hardware-specific qubit coupling constraints;

executing each of the smaller embedded matrix configurations on at least one quantum computing system; and combining solutions of the smaller matrix configurations executions at the at least one quantum computing system to generate a solution to the original matrix configuration and of the problem.

2. The method of claim 1, wherein the problem comprises a combinatorial optimization problem, the matrix configuration comprises a QUBO configuration, the smaller matrix configurations comprise smaller QUBO configurations, and the at least one quantum computing system comprises at least one quantum annealer.

3. The method of claim 2, further comprising cutting the QUBO configuration using a polynomial k-cut algorithm to generate k smaller QUBO configurations.

4. The method of claim 2, further comprising orchestrating the cutting of the QUBO configuration in a classical computing system.

5. The method of claim 2, further comprising executing the smaller QUBO configurations in parallel at multiple quantum annealers.

6. The method of claim 2, further comprising executing the smaller QUBO configurations sequentially at a particular quantum annealer.

7. The method of claim 2, wherein the smaller QUBO configurations include matrices that are more dense than portions of the original QUBO configuration that are discarded when generating the smaller QUBO configurations.

8. The method of claim 2, further comprising setting a cutting threshold level that represents a tradeoff between speed and accuracy when performing the cutting operation.

9. The method of claim 1, further comprising performing the cutting in polynomial time.

10. The method of claim 1, further comprising converting each of the smaller matrix configurations to a graph and performing a minor embedding operation for each of the graphs.

11. A non-transitory storage medium having stored therein instructions that are executable by one or more hardware processors to perform operations comprising:

generating an original Quadratic Unconstrained Binary Optimization (QUBO) matrix configuration of a problem received at an orchestration engine;

cutting the original QUBO matrix configuration into smaller matrix configurations by executing, at a QUBO cutting engine, a polynomial k-cut algorithm that partitions variables of the QUBO into k subsets based on coefficients of the QUBO matrix and discards coefficients connecting variables belonging to different subsets to generate k smaller QUBO configurations;

for each of the k smaller QUBO configurations, converting the smaller QUBO configuration to a graph and performing a minor embedding operation that maps the graph to qubit connectivity of a quantum annealer in accordance with hardware-specific qubit coupling constraints;

executing each of the smaller embedded matrix configurations on at least one quantum computing system; and combining solutions of the smaller matrix configurations executions at the at least one quantum computing system to generate a solution to the original matrix configuration and of the problem.

12. The non-transitory storage medium of claim 11, wherein the problem comprises a combinatorial optimization problem, the matrix configuration comprises a QUBO configuration, the smaller matrix configurations comprise smaller QUBO configurations, and the at least one quantum computing system comprises at least one quantum annealer.

13. The non-transitory storage medium of claim 12, further comprising cutting the QUBO configuration using a polynomial k-cut algorithm to generate k smaller QUBO configurations.

14. The non-transitory storage medium of claim 12, further comprising orchestrating the cutting of the QUBO configuration in a classical computing system.

15. The non-transitory storage medium of claim 12, further comprising executing the smaller QUBO configurations in parallel at multiple quantum annealers.

16. The non-transitory storage medium of claim 12, further comprising executing the smaller QUBO configurations sequentially at a particular quantum annealer.

17. The non-transitory storage medium of claim 12, wherein the smaller QUBO configurations include matrices that are more dense than portions of the original QUBO configuration that are discarded when generating the smaller QUBO configurations.

18. The non-transitory storage medium of claim 12, further comprising setting a cutting threshold level that represents a tradeoff between speed and accuracy when performing the cutting operation.

19. The non-transitory storage medium of claim 11, further comprising performing the cutting in polynomial time.

20. The non-transitory storage medium of claim 11, further comprising converting each of the smaller matrix configurations to a graph and performing a minor embedding operation for each of the graphs.

* * * * *